United States Patent
Kristensen et al.

(10) Patent No.: US 8,660,754 B2
(45) Date of Patent: Feb. 25, 2014

(54) STEER BY WIRE CONTROL SYSTEM

(75) Inventors: John Kristensen, Soenderborg (DK); Preben Albrecht, Soenderborg (DK); Steve Crow, Ames, IA (US); Kjeld Buus Jensen, Soenderborg (DK)

(73) Assignee: Sauer-Danfoss Aps, Nordborg (DK)

(*) Notice: Subject to any disclaimer, the term of this patent is extended or adjusted under 35 U.S.C. 154(b) by 1352 days.

(21) Appl. No.: 12/191,393

(22) Filed: Aug. 14, 2008

(65) Prior Publication Data
US 2009/0048736 A1 Feb. 19, 2009

(30) Foreign Application Priority Data
Aug. 17, 2007 (DK) .................................. 2007 01177

(51) Int. Cl.
*B62D 6/00* (2006.01)
(52) U.S. Cl.
USPC .................. 701/42; 701/36; 701/41; 701/43; 701/44; 701/45; 180/446

(58) Field of Classification Search
None
See application file for complete search history.

(56) References Cited

U.S. PATENT DOCUMENTS

| | | | | |
|---|---|---|---|---|
| 4,865,144 A | * | 9/1989 | North | 180/402 |
| 5,275,251 A | | 1/1994 | Thomsen et al. | |
| 5,471,205 A | * | 11/1995 | Izawa | 340/995.27 |
| 6,013,994 A | * | 1/2000 | Endo et al. | 318/432 |
| 6,067,782 A | | 5/2000 | Diekhans | |
| 6,076,627 A | * | 6/2000 | Bohner et al. | 180/422 |
| 6,082,482 A | * | 7/2000 | Kato et al. | 180/402 |
| 6,219,604 B1 | * | 4/2001 | Dilger et al. | 701/41 |
| 6,336,519 B1 | | 1/2002 | Bohner et al. | |
| 6,594,568 B2 | * | 7/2003 | Matsuoka | 701/41 |
| 6,625,530 B1 | * | 9/2003 | Bolourchi | 701/42 |
| 6,640,923 B1 | * | 11/2003 | Dominke et al. | 180/446 |
| 6,650,979 B1 | * | 11/2003 | Kreft | 701/41 |
| 6,668,967 B2 | | 12/2003 | Sorensen et al. | |
| 6,697,680 B2 | | 2/2004 | Lin et al. | |
| 6,697,722 B2 | * | 2/2004 | Fujimori | 701/41 |
| 6,755,276 B2 | * | 6/2004 | Clephas | 180/402 |
| 6,871,127 B2 | | 3/2005 | Dominke et al. | |
| 6,879,118 B2 | | 4/2005 | Cao et al. | |
| 7,186,155 B2 | * | 3/2007 | Nickerson | 440/1 |

(Continued)

FOREIGN PATENT DOCUMENTS

| | | |
|---|---|---|
| DE | 199 12 169 A1 | 7/2000 |
| EP | 0856453 A2 | 8/1998 |
| EP | 1279585 A1 | 1/2003 |
| GB | 2 188 892 A | 10/1987 |

*Primary Examiner* — Khoi Tran
*Assistant Examiner* — Jonathan L Sample
(74) *Attorney, Agent, or Firm* — McCormick, Paulding & Huber LLP

(57) ABSTRACT

The invention provides a steering system for a vehicle, a ship etc. The steering system has a steering handle for the operator of the vehicle, a set of signal processors, a sensor which determines a position of the steered element of the vehicle, and a controller which moves the steered element. The steered element could e.g. be the front wheels of a car. The signal processors are adapted to determine an error between the desired position of the steered element and an actual position of the steered element. In order to make the steering system more fault tolerant, the error signal is amplified based on the speed by which the steering handle is moved, and an error in the sensor therefore becomes less critical. The invention further provides a steering method, a steering control unit and a vehicle provided with a steering system of the mentioned kind.

10 Claims, 2 Drawing Sheets

(56) References Cited

U.S. PATENT DOCUMENTS

| | | | |
|---|---|---|---|
| 7,366,602 B2* | 4/2008 | Xu et al. | 701/70 |
| 7,386,379 B2* | 6/2008 | Naik et al. | 701/41 |
| 7,739,001 B2* | 6/2010 | Kato et al. | 701/2 |
| 7,826,950 B2* | 11/2010 | Tamaizumi et al. | 701/42 |
| 7,908,056 B2* | 3/2011 | Hwang | 701/41 |
| 2001/0027364 A1* | 10/2001 | Matsuoka | 701/41 |
| 2003/0028306 A1* | 2/2003 | Fujimori | 701/41 |
| 2004/0182626 A1* | 9/2004 | Katou et al. | 180/226 |
| 2005/0102083 A1* | 5/2005 | Xu et al. | 701/70 |
| 2005/0189161 A1* | 9/2005 | Zheng et al. | 180/402 |
| 2005/0209752 A1* | 9/2005 | Ono et al. | 701/41 |
| 2005/0252433 A1* | 11/2005 | Gai | 114/144 R |
| 2006/0278152 A1* | 12/2006 | Nickerson | 114/144 R |
| 2007/0170667 A1* | 7/2007 | Xu et al. | 280/5.507 |
| 2007/0213901 A1* | 9/2007 | Shin et al. | 701/41 |
| 2007/0256884 A1* | 11/2007 | Rekow et al. | 180/403 |
| 2008/0086251 A1* | 4/2008 | Lu et al. | 701/70 |
| 2009/0024281 A1* | 1/2009 | Hwang | 701/42 |

* cited by examiner

STEER BY WIRE CONTROL SYSTEM

CROSS REFERENCE TO RELATED APPLICATION

Applicant hereby claims foreign priority benefits under U.S.C. §119 from Danish Patent Application No. PA 2007 01177 filed on Aug. 17, 2007, the contents of which are incorporated by reference herein.

FIELD OF THE INVENTION

The present invention relates to a control system for controlling movement of a steering element, e.g. a wheel of a vehicle. The control system comprises an input device with a movable steering handle, e.g. a steering wheel or a joystick. The input device generates a handle position signal indicative of a position of the handle. The control system further comprises a processing structure which converts the handle position signal into a velocity reference signal by which a steering controller can conduct movement of the steering element.

BACKGROUND OF THE INVENTION

The control system according to the present invention may be used in general for controlling the operation of a machine. In the following, the invention will be exemplified by reference to a steering system.

Ships and vehicles, and in particular off-highway machinery such as wheel loaders, excavators, dozers, articulated vehicles, tractors, harvesters and similar heavy duty machines often operate with hydraulic, electro-hydraulic, and electric steering systems. Typically, the steering system receives an operator input to indicate a desired angular movement of the ship or vehicle. The input could be provided via input means such as a joystick, a steering wheel, or the input could be derived from a GPS system or similar system for positioning and tracking. The input is converted into a signal for an actuator, e.g. a hydraulic cylinder, which moves a steered element, e.g. a wheel of a vehicle or a rudder of a ship. Steering systems are disclosed e.g. in U.S. Pat. No. 6,668,967 and in EP0856453.

In connection with so called "steer by wire" (in the following SBW) applications, a position feed back signal and a closed loop control system are normally applied to increase the accuracy and reliability. In such systems, a sensor is fixed to the steered element and feeds back e.g. an angular position of the element. Since faults in the sensor may result in malfunction of the steering system and in worst case in wrong movement of the steered element, the sensor is a critical component.

To increase safety, the sensing task may either be handled by several sensors in parallel or it may be handled by very high quality sensors or sensors with an internal fault diagnosis feature, and evidently, the sensing task is expensive.

U.S. Pat. No. 5,275,251 discloses a hydraulic steering in which a steering angle error is compensated. In this case, a wheel position and a steering wheel position are compared, and a correction signal is utilized for correcting the wheel position relative to the steering wheel position in case the steering wheel is rotated. The compensation of the steering angle error is effected at every steering handwheel speed and at any steering angle error. Since correction of errors occur at any speed and at any error, system reliability is very important, and there is a risk that the driver of the vehicle feels overruled.

SUMMARY OF THE INVENTION

It is an object of embodiments of the invention to increase safety and simplicity or to reduce costs of steering systems. These objects could be fulfilled by a system with a first signal processor adapted to provide an error signal based on an arithmetic operation involving the handle position signal and the steering element position signal, e.g. based on a difference between the handle position signal and the steering element position signal. The system further comprises a second signal processor adapted to provide a correction signal based on the handle velocity signal and the error signal, and a third signal processor adapted to provide a velocity reference based on an arithmetic operation involving the handle velocity signal and the correction signal, e.g. based on a sum of the handle velocity signal and the correction signal.

It may be desired to provide a specific relation between a position of the steering handle and a corresponding position of the steering element. Accordingly, the velocity reference to the steering controller can be adjusted by use of a correction signal which depends on an angle error between the steering wheel and the steering element positions. According to the present invention, this correction signal is modified based on the handle velocity signal so that velocities below a certain limit do not result in correction and the risk of dangerous situations if the sensor fails is therefore reduced. Accordingly, it is unnecessary to use sensors of very high quality or to use arrays of sensors to ensure proper sensing of the steering element position. Furthermore, since the correction may depend of the movement of the steering handle, the risk of feeling overruled by the correction system can be reduced.

The input device may be of any known kind for steering a vehicle, a ship or similar machine, and the handle may e.g. be a steering wheel, a joystick, a set of push buttons etc. The input device may provide the handle position signal as a continuous signal, e.g. as an analogue signal, or it may provide the handle position signal as a stream of digital values provided at a certain clock-frequency. The position signals are indicative of the position of the input device.

The steering element could e.g. be a wheel or a rudder, or it could be any means for steering a machine, ship, or vehicle, e.g. a hydraulic cylinder which acts upon a wheel or rudder. The sensor could, correspondingly, be any kind of means for sensing a position or a movement of the steering element.

The speed processor may be adapted to read handle position signals and to convert the signals into a signal which is indicative of the speed by which the handle is moved. In one simple embodiment, the speed processor is capable of providing a first order derivative of a handle position function.

The first signal processor may provide the error signal simply by summation of the handle position signal and the steering element position signal, by subtraction of the handle position signal from the steering element position signal, or by any kind of arithmetic manipulation of the handle position signal with the steering element position signal.

The second signal processor provides an amplification parameter, e.g. a value between 0 and 1. The amplification parameter depends on the velocity signal, e.g. so that a higher speed of the handle results in a higher amplification parameter. As an example, the amplification parameter may be reduced to 0 when the steering handle is not moved or when the speed of the steering handle comes below a pre-specified value. Accordingly the correction signal, which may e.g. be the error signal multiplied with the amplification parameter, also becomes 0 when the steering handle is not moved or when the speed of the steering handle comes below a pre-specified value. As another example, the correction signal may have a value which is at most 20 pct of the velocity reference.

The third signal processor may provide the velocity reference simply by addition of the handle velocity signal and the correction signal, or by any kind of arithmetic manipulation of the handle velocity signal and the correction signal.

The steering controller could be an electrical controller adapted to move the steering element by use of an electrical actuator, or the steering controller could be an electro-hydraulic controller which receives an electrical velocity reference signal and converts the signal into a hydraulic high pressure signal to a hydraulic actuator which acts upon the steering element.

In one embodiment, the correction signal is physically limited. In a digital system, the limitation of the signals may be obtained by a bit size of an electronic component for storing the various signals.

As an example, the handle velocity signal may be stored in a digital hardware with a 10 bit variable register, the correction signal could be stored in hardware having an 8 bit register, and the velocity reference signal could be stored in an 11 bit register (if a signal is stored in binary form in a data array with 8 bits, the signal is limited to the size of 255 since larger binary numbers can not be expressed within 8 bits etc). As an example, the correction signal register may limit the size of the correction signal to 20-30 pct, such as 25 pct of the handle velocity signal register so that the correction signal never becomes larger than 20-30 pct of the handle velocity signal. The signals could also be limited in an analogue circuit as will be described in further details later with reference to FIG. 4.

In a second aspect, the invention provides a control unit for a steering system, the control unit comprising computer means programmed to:

receive a sequence of handle position signals, determine a handle velocity signal from the sequence, receive a steering element position signal from a sensor, provide an error signal based on an arithmetic operation involving a handle position signal and the steering element position signal such as based on a difference between a handle position signal and the steering element position signal, provide an amplification parameter which depends on the velocity signal, and to provide a correction signal based on an arithmetic operation involving the error signal and the amplification parameter such as based on a multiplication of the error signal with the amplification parameter, and provide a velocity reference based on an arithmetic operation involving the handle velocity signal and the correction signal such as based on a summation of the handle velocity signal and the correction signal, the velocity reference being in a format receivable by a steering controller for conversion into movement of a steering element.

The handle position signals are indicative of a position of a steering handle, and the sequence may either comprise an analogue signal received continuously, or series of digital signals received intermittently.

In a third aspect, the invention provides a method of controlling movement of a steering element based on a input via a steering handle, the method comprising:

determining a handle position value indicative of a position of the steering handle, determining a speed value indicative of a speed of the steering handle, determining a steering element position value indicative of a position of the steering element, comparing the handle position value with the steering element position value, and based on the comparison, providing an error signal, modifying the error signal based on the speed value to provide a modified error signal, modifying the speed value based on the modified error signal to provide a modified speed value, and moving the steering element based on the modified speed value.

In a fourth aspect, the invention provides a vehicle with a steering element by which the vehicle is steered, and a steering system for moving the steering element, the steering system comprising:

an input device with a movable steering handle adapted to provide a handle position signal indicative of a position of the handle, a speed processor adapted to provide a handle velocity signal indicative of a speed of the steering handle, a sensor adapted to generate a steering element position signal indicative of a position of the steering element, a first signal processor adapted to provide an error signal based on an arithmetic operation involving the handle position signal and the steering element position signal such as based on a difference between the handle position signal and the steering element position signal, a second signal processor adapted to provide an amplification parameter which depends on the velocity signal, and to provide a correction signal based on an arithmetic operation involving the error signal and the amplification parameter such as based on a multiplication of the error signal with the amplification parameter, a third signal processor adapted to provide a velocity reference based on an arithmetic operation involving the handle velocity signal and the correction signal such as based on a summation of the handle velocity signal and the correction signal, and a steering controller adapted to convert the velocity reference into movement of the steering element.

The vehicle may in particular be an off-highway machinery such as a wheel loader, an excavator, a dozer, an articulated vehicle wherein the steered element is constituted by a one half of the vehicle relative to another half of the vehicle, a tractor, a harvester or any similar kind of heavy duty machines.

Any of the features described relative to the first aspect of the invention may apply also for the methods of the second and third aspects of the invention and for the vehicle of the fourth aspect of the invention.

BRIEF DESCRIPTION OF THE DRAWINGS

In the following, a preferred embodiment of the invention will be described in further details with reference to the drawing in which.

DETAILED DESCRIPTION

Figure 1:
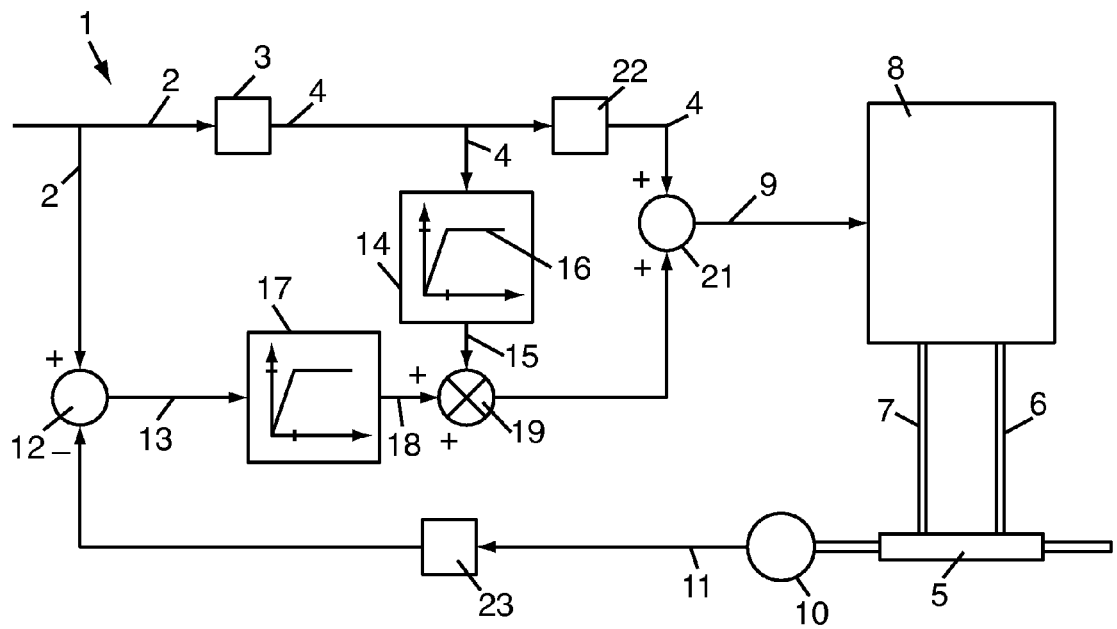
FIG. 1 illustrates a diagram of a control system according to the invention.

The steering system 1 illustrated diagrammatically in FIG. 1, comprises an input device with a handle (not shown) by which an operator may indicate a desired steering action. The input device generates a handle position signal 2 which is indicative of a position of the handle. The speed processor 3 provides, based on the handle position signal 2, a handle velocity signal 4. In the illustrated embodiment, the input device is a steering wheel, the handle position signal indicates an angular position, θ, of the steering wheel, and the speed processor calculates $$\omega = \frac{\partial \theta}{\partial t}$$

and provides a signal significant therefore. The steering system is provided for a vehicle (not shown) with wheels (not shown), and the wheels are moved by the steering piston/cylinder 5. The steering piston is moved by a hydraulic high pressure fluid provided in the pipes 6, 7 by the steering controller 8. The steering controller is an electro-hydraulic controller which receives an electrical velocity reference signal 9 and controls a fluid source based thereon. The steering system comprises a sensor 10 which generates a steering element position signal 11 indicative of a position of the piston and thus indicative of the position of the wheels by which the vehicle is steered. The steering element position signal 11 could e.g. be indicative of an angular position of the wheel relative to a reference position, e.g. relative to a position in which the vehicle follows a straight path. The first signal processor 12 provides, based on the handle position signal 2 and the steering element position signal 11, an error signal 13. The error signal 13 represents a difference between a desired steering element position (provided via the handle), and the actual steering element position (provided via the steering element position signal). The error signal 13 could be determined simply by subtraction of the steering element position signal 11 from the handle position signal 2, or in fact by any arithmetic operation by which a difference between the signals can be represented.

A function 14 provides, based on the handle velocity signal 4, an amplification parameter 15, in this case a value between zero and one. When the handle is not moving, the amplification parameter is set to zero, and when the handle is moved with a maximum speed, the amplification parameter is set to 1. The chart representing the function 14, illustrates a scale between the handle velocity signal 4 and the amplification parameter. The horizontal part 16 of the graph illustrates a limit value which could be defined by a physical limit of an electronic storage, e.g. an 8 or 16 bit limit. In the disclosed embodiment, the upper limit is one.

The function 17 illustrates a scale factor between the error signal and the amplified error signal 18. The Limit value could be defined by a physical limit of an electronic storage, e.g. an 8 or 16 bit limit.

The second signal processor 19 also provides a correction signal 20 by an arithmetic operation which includes multiplication of the amplified error signal 18 by the amplification parameter 15.

A third signal processor 21 provides the velocity reference 9 by an arithmetic operation which includes summation of the handle velocity signal 4 and the correction signal 20.

In addition to the abovementioned main components of the steering system, an amplifier 22 may be inserted to amplify the handle velocity signal 4. In a similar manner, the steering element position signal 11 may be amplified by an amplifier 23. The amplifies may not necessarily be incorporated, at each of the signals may be additionally amplified or changed by any additional component as long as each signal in a suitable manner represents what it is supposed to represent.

Figure 2:
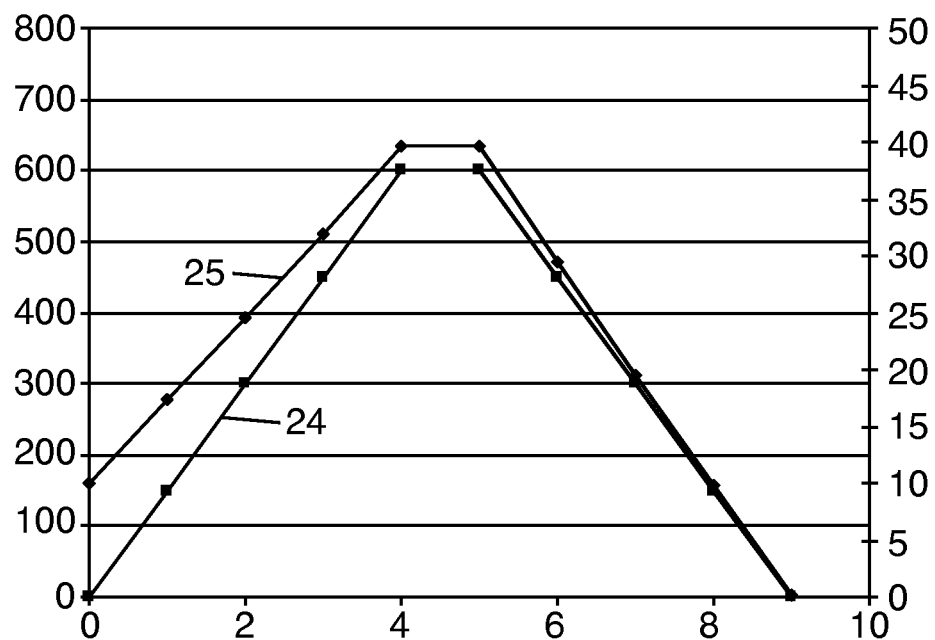
FIG. 2 illustrates a graph with wheel angle signal as a function of time.
Figure 3:
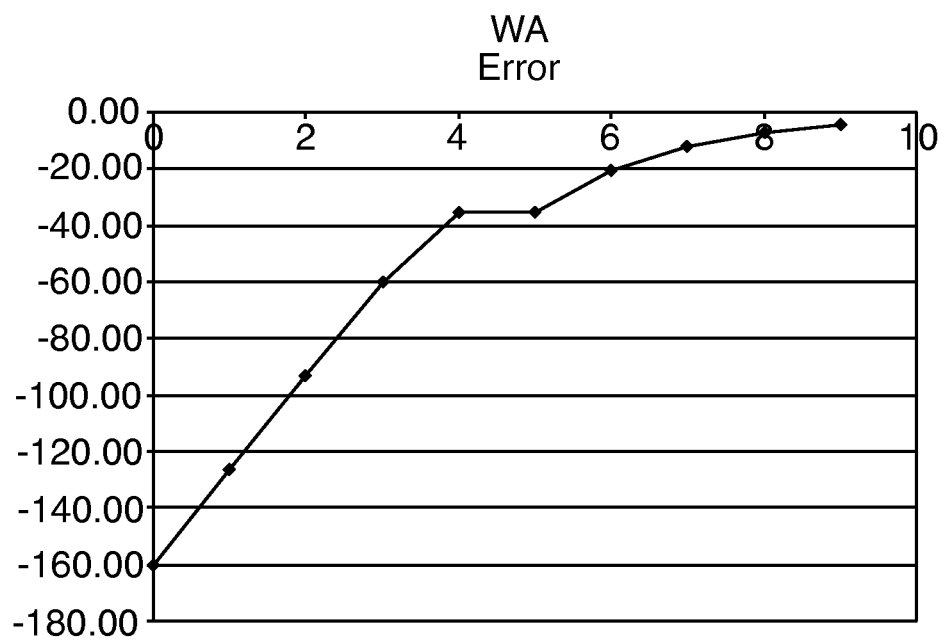
FIG. 3 illustrates a graph with wheel angle error as a function of time.

The data are found by simulation. FIG. 2 illustrates a graph with steering wheel angle and wheel angle as a function of time, and FIG. 3 illustrates a graph with wheel angle error as a function of time. The data presented in FIGS. 2 and 3 have been found by simulation. In FIG. 2, the graph 24 illustrates a steering wheel angle, and graph 25 illustrates a corresponding wheel angle of a vehicle.

Figure 4:
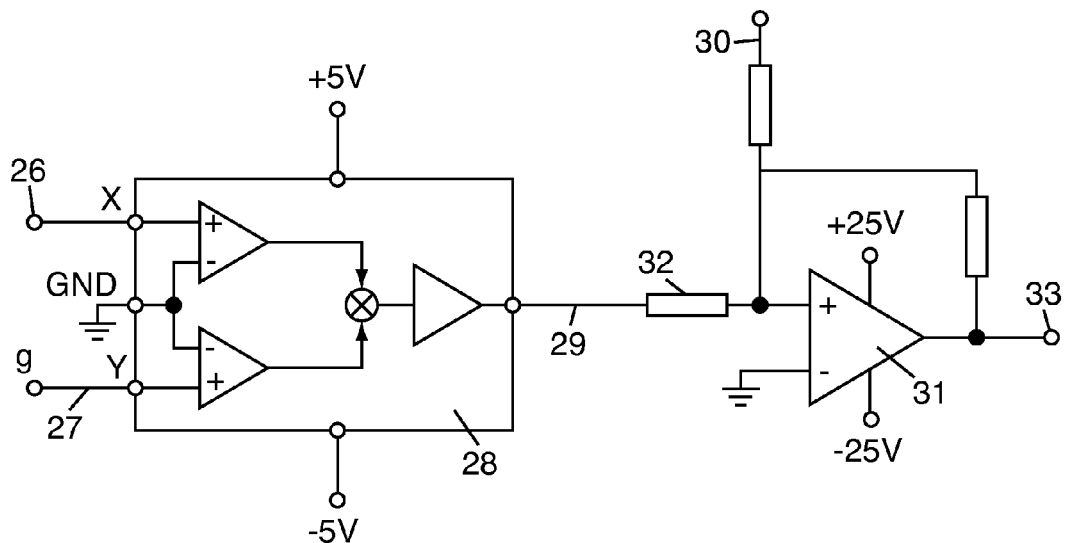
FIG. 4 illustrates diagrammatically analogue means for limitation of the correction signal.

FIG. 4 illustrates a diagram of a circuit for an analogue implementation of:

the second signal processor, i.e. a multiplier, shown with numeral 19 in FIG. 1;

the limitation function 17, cf. FIG. 1; and the summation included in the third signal processor 21, cf. FIG. 1.

The error signal 13 is received on the port 26, and the amplification parameter 15 is received on the port 27 of the multiplier 28 which in response generates a correction signal 29.

The correction signal 29 will never exceed the supplied voltage +/−5V which corresponds to 20% of the maximum Velocity reference. The correction signal 29 is subsequently added to the steering handle velocity signal 4 received on port 30 by use of the amplifier 31 and resistor(s) 32. The reference signal for the flow control device is subsequently available on the output 33 of the amplifier. The resistor 32 which connects the multiplier 28 and amplifier 31 may, for security reasons, be split into several serially connected resistors.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A steering system for controlling movement of a steering element, the control system comprising:
    an input device with a movable steering handle adapted to provide a handle position signal indicative of a position of the handle,
    a speed processor adapted to provide a handle velocity signal indicative of a speed of the steering handle,
    a sensor adapted to generate a steering element position signal indicative of a position of the steering element,
    a first signal processor adapted to provide an error signal based on an arithmetic operation involving the handle position signal and the steering element position signal,
    a second signal processor adapted to provide an amplification parameter which depends on the velocity signal, and to provide a correction signal based on an arithmetic operation involving the error signal and the amplification parameter,
    a third signal processor adapted to provide a velocity reference based on an arithmetic operation involving the handle velocity signal and the correction signal, and
    a steering controller adapted to convert the velocity reference into movement of the steering element.

2. The system according to claim 1, wherein the correction signal is reduced to zero when the speed of the steering handle is below a pre-specified value.

3. The system according to claim 1, wherein the steering controller is adapted to provide movement based on a hydraulic pressure.

4. The system according to claim 1, wherein the correction signal has a value which is at most 20 pct of the velocity reference.

5. The system according to claim 1, wherein at least one of the signal processors comprises a computer processing unit having computer control instructions adapted for the function of the at least one signal processor.

6. The system according to claim 5, wherein the value of the correction signal is physically limited by a bit size of the computer processing unit.

7. A control unit for a steering system, the control unit comprising at least one processor programmed to:
receive a sequence of handle position signals,
determine a handle velocity signal from the sequence,
receive a steering element position signal from a sensor,
provide an error signal based on an arithmetic operation involving a handle position signal and the steering element position signal,
provide an amplification parameter which depends on the velocity signal, and to provide a correction signal based on an arithmetic operation involving the error signal and the amplification parameter, and
provide a velocity reference based on an arithmetic operation involving the handle velocity signal and the correction signal, and
the velocity reference being in a format receivable by a steering controller for conversion into movement of a steering element.

8. A method of controlling movement of a steering element based on an input via a steering handle, the method, executable by at least one processor, comprising:
determining a handle position value indicative of a position of the steering handle,
determining a speed value indicative of a speed of the steering handle,
determining a steering element position value indicative of a position of the steering element,
comparing the handle position value with the steering element position value, and based on the comparison, providing an error signal,
modifying the error signal based on the speed value to provide a modified error signal,
modifying the speed value based on the modified error signal to provide a modified speed value, and
moving the steering element based on the modified speed value.

9. A vehicle with a steering element by which the vehicle is steered, and a steering system for moving the steering element, the steering system comprising:
an input device with a movable steering handle adapted to provide a handle position signal indicative of a position of the handle,
a speed processor adapted to provide a handle velocity signal indicative of a speed of the steering handle,
a sensor adapted to generate a steering element position signal indicative of a position of the steering element,
a first signal processor adapted to provide an error signal based on an arithmetic operation involving the handle position signal and the steering element position signal,
a second signal processor adapted to provide an amplification parameter which depends on the velocity signal, and to provide a correction signal based on an arithmetic operation involving the error signal and the amplification parameter,
a third signal processor adapted to provide a velocity reference based on an arithmetic operation involving the handle velocity signal and the correction signal, and
a steering controller adapted to convert the velocity reference into movement of the steering element.

10. The vehicle according to claim 9, wherein the steering controller is an electrohydraulic controller.

* * * * *